US011460593B2

(12) United States Patent
Padhi et al.

(10) Patent No.: US 11,460,593 B2
(45) Date of Patent: Oct. 4, 2022

(54) MITIGATION OF SEISMIC MULTIPLES IN SEISMIC DATA USING INVERSION

(71) Applicant: Halliburton Energy Services, Inc., Houston, TX (US)

(72) Inventors: Amit Padhi, Houston, TX (US); Mark Elliott Willis, Katy, TX (US); Xiaomin Zhao, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 137 days.

(21) Appl. No.: 16/610,857

(22) PCT Filed: Dec. 13, 2018

(86) PCT No.: PCT/US2018/065398
§ 371 (c)(1),
(2) Date: Nov. 4, 2019

(87) PCT Pub. No.: WO2020/122915
PCT Pub. Date: Jun. 18, 2020

(65) Prior Publication Data
US 2021/0103063 A1    Apr. 8, 2021

(51) Int. Cl.
*G01V 1/28* (2006.01)
*G01V 1/30* (2006.01)
(52) U.S. Cl.
CPC ............. *G01V 1/282* (2013.01); *G01V 1/306* (2013.01); *G01V 2210/14* (2013.01); *G01V 2210/32* (2013.01); *G01V 2210/626* (2013.01)
(58) Field of Classification Search
CPC . G01V 1/28; G01V 1/282; G01V 1/30; G01V 1/306; G01V 2210/14; G01V 2210/32; G01V 2210/626
See application file for complete search history.

(56) References Cited

U.S. PATENT DOCUMENTS

| 4,954,998 A | | 9/1990 | Rector |
| 5,583,825 A | * | 12/1996 | Carrazzone ............ G01V 1/288 367/83 |

(Continued)

FOREIGN PATENT DOCUMENTS

EP    2530492 B1    12/2012

OTHER PUBLICATIONS

PCT Application Serial No. PCT/US2018/065398, International Search Report, dated Aug. 13, 2019, 3 pages.

(Continued)

*Primary Examiner* — Manuel A Rivera Vargas
*Assistant Examiner* — Yaritza H Perez Bermudez
(74) *Attorney, Agent, or Firm* — Delizio, Peacock, Lewin & Guerra

(57) ABSTRACT

An apparatus obtains measurements from a seismic sensor, wherein the seismic measurements include a set of seismic waves having at least a subset of seismic multiples and a machine-readable medium having program code executable by a processor to cause the apparatus to determine seismic measurements of the seismic waves, fit reflectivity model based on a set of reflectivity models using a nonlinear scheme to the seismic measurements, and identify a subset of the seismic measurements corresponding to the subset of seismic multiples. The apparatus also includes program code to cause the apparatus to generate a set of reduced-noise seismic measurements based on attenuation of the subset of the seismic measurements.

20 Claims, 9 Drawing Sheets

(56) References Cited

U.S. PATENT DOCUMENTS

| | | | |
|---|---|---|---|
| 7,123,543 B2* | 10/2006 | Vaage | G01V 1/38 367/24 |
| 9,316,754 B2 | 4/2016 | Kragh et al. | |
| 10,408,052 B2* | 9/2019 | Mandal | G01V 1/50 |
| 11,227,345 B2* | 1/2022 | Sundaresh | G06Q 50/06 |
| 2007/0203673 A1* | 8/2007 | Sherrill | G01V 1/30 702/14 |
| 2008/0255762 A1* | 10/2008 | Carvill | G01V 1/3808 702/18 |
| 2011/0222371 A1* | 9/2011 | Liu | G01V 13/00 367/13 |
| 2011/0267921 A1* | 11/2011 | Mortel | G01V 1/28 367/57 |
| 2013/0085731 A1* | 4/2013 | De Stefano | G01V 3/081 703/6 |
| 2013/0322212 A1* | 12/2013 | Pica | G01V 1/303 367/38 |
| 2014/0102694 A1* | 4/2014 | Hargreaves | E21B 49/00 166/250.01 |
| 2015/0032379 A1 | 1/2015 | Campbell et al. | |
| 2016/0047924 A1* | 2/2016 | Krohn | G01V 1/303 703/2 |
| 2016/0097870 A1* | 4/2016 | Routh | G01V 1/282 703/2 |
| 2016/0139283 A1* | 5/2016 | Kamil | G01V 1/3808 702/17 |
| 2016/0178772 A1* | 6/2016 | Carter | G01V 1/42 702/17 |
| 2017/0192118 A1* | 7/2017 | Du | G01V 1/282 |
| 2017/0199289 A1* | 7/2017 | Peng | G01V 1/282 |
| 2017/0242142 A1* | 8/2017 | Jiao | E21B 49/00 |
| 2017/0248716 A1* | 8/2017 | Poole | G01V 1/364 |
| 2018/0120464 A1* | 5/2018 | Sun | G01V 1/282 |
| 2018/0275302 A1* | 9/2018 | Calderón | G01V 1/364 |
| 2019/0086567 A1* | 3/2019 | Hampson | G01V 1/20 |
| 2019/0170889 A1* | 6/2019 | Hampson | G01V 1/38 |
| 2020/0158898 A1* | 5/2020 | Le Guern | G01V 1/345 |
| 2020/0292724 A1* | 9/2020 | Boiero | G01V 1/3808 |
| 2021/0149066 A1* | 5/2021 | Wu | G01V 1/005 |

OTHER PUBLICATIONS

PCT Application Serial No. PCT/US2018/065398, International Written Opinion, dated Aug. 13, 2019, 4 pages.

Rickett, et al., "Adaptive multiple subtraction with non-stationary helical shaping filters", Stanford Exploration Project, Report 108, Apr. 29, 2001, pp. 1-8.

Guitton, et al., "Adaptive subtraction of multiples using the L1-norm", Geophysical Prospecting, vol. 52 (2004); pp. 27-38.

Kennett, et al., "Seismic waves in a stratified half-space—IV: P—SV wave decoupling and surface wave dispersion", Geophysical Journal International, vol. 72, Iss. 3, Mar. 1983, pp. 633-645.

Mallick, et al., "Amplitude-variation-with-offset and prestack-waveform inversion: A direct comparison using a real data example from the Rock Springs Uplift, Wyoming, USA", Geophysics, vol. 80, No. 2 (2015); pp. 845-859.

Mallick, et al., "Practical aspects of reflectivity modeling", Geophysics, vol. 52, No. 10 (1987); pp. 1355-1364.

Mallick, et al., "Rapid computation of multioffset vertical seismic profile synthetic seismograms for layered media", Geophysics, vol. 53, No. 4 (1988); pp. 479-491.

Mallick, "Some practical aspects of prestack waveform inversion using a genetic algorithm: An example from the east Texas Woodbine gas sand", Geophysics, vol. 64, No. 2 (Mar.-Apr. 1999); pp. 326-336.

* cited by examiner

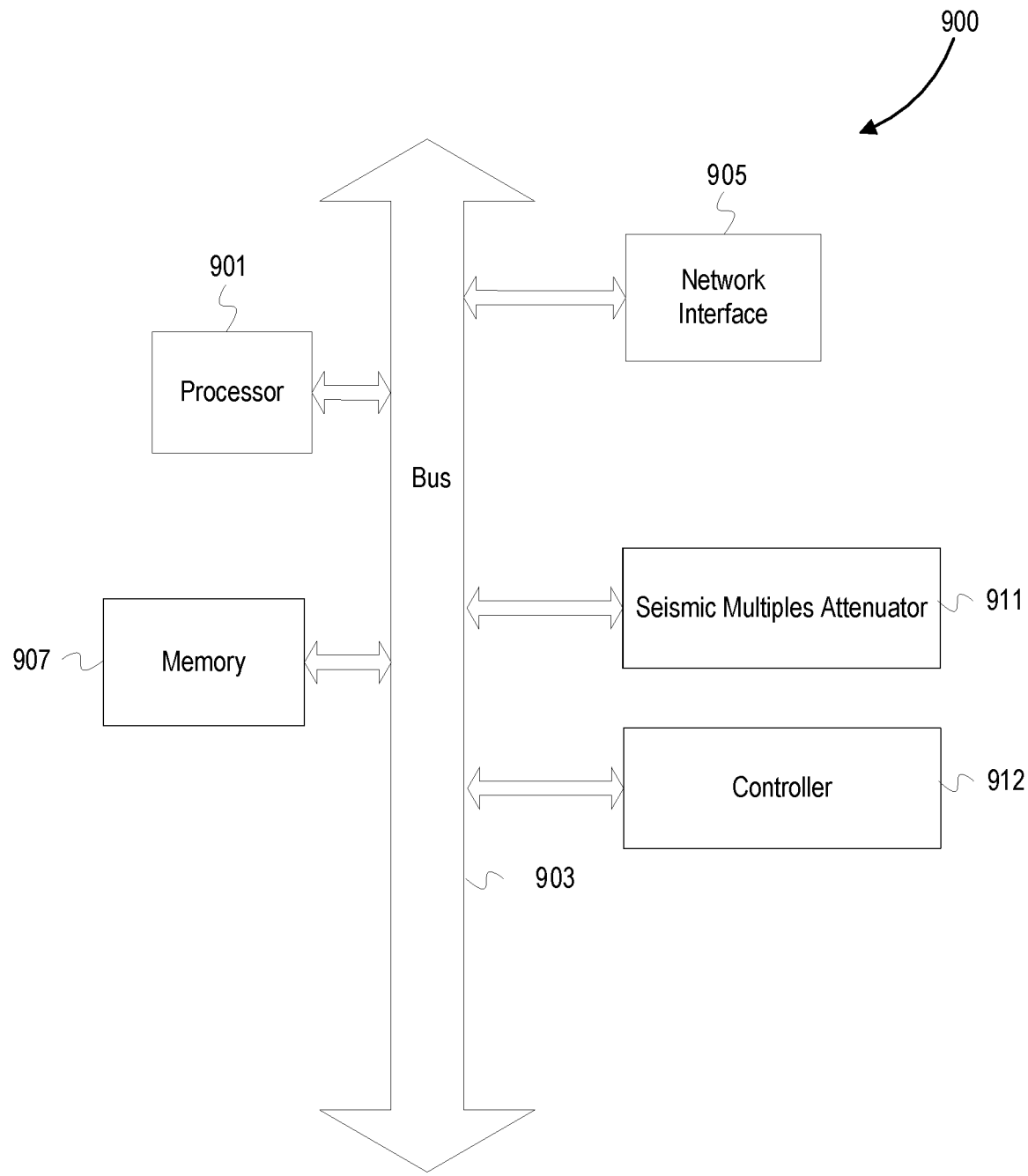

MITIGATION OF SEISMIC MULTIPLES IN SEISMIC DATA USING INVERSION

TECHNICAL FIELD

The disclosure generally relates to the field of subsurface characterization and more particularly to seismic signal processing.

BACKGROUND

Seismic sensors at the earth surface or in a borehole measure seismic waves generated by one or more seismic disturbances. In cases where a source of seismic disturbance is known, the distance between the source and the seismic sensor (or the center of a set of seismic sensors) is known as an "offset." These measured seismic waves provide the data to generate a vertical seismic profile (VSP) and provide an understanding of subsurface geological features in a formation (e.g. formation layer boundaries, faults, fractures, groups of fractures, porous regions, etc.). An understanding of subsurface geological features is useful to optimizing hydrocarbon production during drilling and stimulation treatments. For example, drilling location, various drilling parameters, production parameters, drilling project characterization and ranking, etc. can be determined based on knowledge of the position and shape of these subsurface geological features.

A seismic wave is categorizable in a variety of ways that are not mutually exclusive. A seismic wave is categorizable as upgoing (from within a formation to the surface) or downgoing (from the surface to within a formation). A seismic wave is also categorizable as a pressure wave (P wave) or a shear wave (S wave), wherein a P wave is distinguishable from the S wave by its wave motion and its ability to transfer through both solid and fluid materials. A seismic wave is also categorizable as a direct wave, primary reflection wave, or seismic multiple. A direct wave travels directly from a seismic source and is not a reflection from a subsurface feature. A primary reflection wave is reflected from one subsurface feature before being measured by a seismic sensor. A seismic multiple is a seismic wave that has been reflected off more than one interlayer boundary in a formation and arrives at a sensor after either its corresponding direct wave or primary reflection wave.

BRIEF DESCRIPTION OF THE DRAWINGS

Embodiments of the disclosure can be better understood by referencing the accompanying drawings.

FIG. 9 depicts an example computer device.

DESCRIPTION OF EMBODIMENTS

Figure 1:
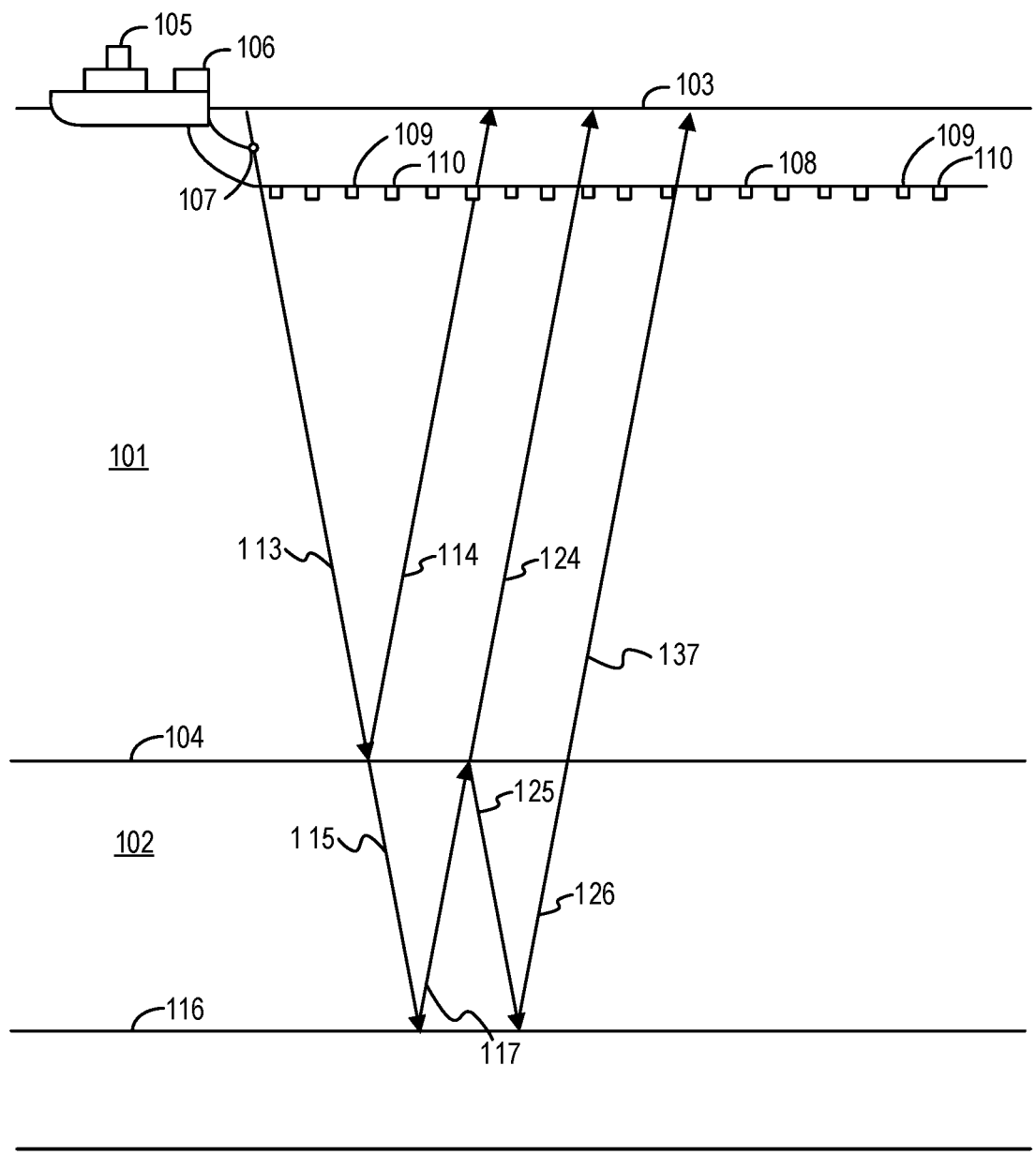
FIG. 1 depicts a schematic diagram of an elevation view of a typical marine seismic survey that can be used to provide seismic measurements.

The description that follows includes example systems, methods, techniques, and program flows that embody aspects of the disclosure. However, it is understood that this disclosure can be practiced without these specific details. For instance, this disclosure refers to a genetic algorithm. Aspects of this disclosure can be instead applied to other optimization methods, such as through using other evolutionary optimization methods, neural networks, Bayesian networks, etc. In other instances, well-known instruction instances, protocols, structures and techniques have not been shown in detail in order not to obfuscate the description.

Various embodiments relate to a seismic multiples mitigation system that detects and/or reduces the effects of seismic multiples on seismic characterization operations. The seismic multiples mitigation system can include a nonlinear scheme method such as a genetic algorithm method to invert a set of measured seismic waves to determine which of the measured seismic waves are direct waves, primary reflection waves, and/or seismic multiples. The measurements of the seismic multiples can be attenuated and/or adaptively subtracted from the set of seismic measurements (e.g. measurements from surface sensors, VSP measurements, stacked images) to increase the accuracy of seismic characterization operations.

In some embodiments, the seismic multiples mitigation system uses seismic measurements acquired from a set of seismic sensors (e.g. sensors in a VSP survey, sensors in a surface survey, etc.). Seismic sensors capable of collecting seismic measurements of both upgoing waves (waves traveling from within a formation to the surface) and downgoing waves (waves traveling from the surface to within a formation) provide a means of identifying seismic multiples in zero offset or near offset seismic measurements. A seismic multiples mitigation system can use identified surface-generated seismic multiples during initial pre-processing to increase the accuracy of seismic characterizations based on seismic measurements. Further pre-processing can be performed to reduce noise and increase the accuracy of the seismic measurements.

After the initial pre-processing, the seismic multiples mitigation system can combine an inversion scheme with the reflectivity method to identify seismic multiples or other specific types of seismic waves based on seismic measurements. A forward-modeling inversion can invert the seismic measurements into one or more fitted reflectivity models using the reflectivity method. The seismic multiples mitigation system can determine the one or more fitted reflectivity models by using a nonlinear scheme with inversion operations that uses one or more initial reflectivity models.

In some embodiments, the fitted reflectivity model is determined based on the seismic measurements as well as a set of fixed density values or a set of density values that are a function of P-wave velocity. The seismic multiples mitigation system can use the one or more fitted reflectivity models to generate synthetic seismic measurements corresponding to various types of seismic multiples (e.g. surface-generated, upgoing, downgoing, etc.). The seismic multiples mitigation system can use the synthetic seismic measurements to identify a subset of seismic measurements corresponding to the seismic multiples. The seismic multiples mitigation system can attenuate and/or adaptively subtract the synthetic seismic measurements and/or the identified subset from the seismic measurements to generate reduced-noise seismic measurements.

These reduced-noise seismic measurements increase the accuracy of seismic characterization operations for a formation and allow an automated means of de-noising seismic measurements. For example, seismic multiples mitigation provides a means of identifying surface-generated seismic multiples, upgoing seismic multiples, and downgoing seismic multiples in zero offset and near offset seismic waves. These identified seismic multiples can be attenuated from seismic measurements using adaptive subtraction to generate reduced-noise seismic measurements. Reduced-noise seismic measurements provide a set of seismic measurements that reduces confusion on the origin of seismic measurements, which increases the accuracy of seismic inversion operations that provide information on various subsurface geological features in the formation. This information provides a means of increasing the efficiency of drilling operations and/or well production operations.

Example Seismic Measurements Acquisition System

FIG. 1 depicts a schematic diagram of an elevation view of a typical marine seismic survey that can be used to provide seismic measurements. A body of water 101 over the first geological layer 102 is bounded at a water surface 103 by a water-air interface and at a water bottom 104 by a water-earth interface. Beneath the water bottom 104 is a first geological layer 102. Beneath the first geological layer 102 is a second geological layer 132, which is a subterranean layer of interest. A seismic vessel 105 travels on the water surface 103 and contains seismic acquisition control equipment 106. The seismic acquisition control equipment 106 includes navigation control, seismic source control, seismic sensor control, and recording equipment.

The seismic acquisition control equipment 106 includes a seismic source 107 to actuate at selected times. In response, the seismic source 107 emits seismic waves. Seismic streamers 108 contain seismic sensors to detect the reflected waves initiated by the seismic source 107 and reflected from interfaces in the environment. The seismic streamers 108 can contain seismic sensors such as hydrophones 109 and/or water particle motion sensors such as geophones 110. The hydrophones 109 and geophones 110 are typically co-located in pairs or pairs of sensor arrays at regular intervals along the seismic streamers 108.

The seismic source 107 is activated at periodic intervals to emit seismic waves in the vicinity of the seismic streamers 108 with the hydrophones 109 and the geophones 110. Each time the seismic source 107 is actuated, an acoustic/seismic wave travels upwardly or downwardly in spherically expanding wave fronts. The traveling waves will be illustrated by ray paths normal to the expanding wave fronts. The downwardly traveling wave from the seismic source 107 traveling along a ray path 113 will reflect off the earth-water interface at the water bottom 104 and then travel upwardly along ray path 114, where the wave can be detected by the hydrophones 109 and geophones 110. Such a reflection at the water bottom 104, as in ray path 114, contains information about the water bottom 104 and hence can be retained for further processing. Additionally, the downwardly traveling wave traveling along ray path 113 can transmit through the water bottom 104 and travel along ray path 115 before reflecting off a layer boundary 116. This wave can then travel upwardly along ray path 117, transmit through the water bottom 104, and travels upwardly along ray path 124 until it is detected by the hydrophones 109 and geophones 110. Such a reflection off the layer boundary 116 can contain useful information about subterranean formations of interest that can be used to generate seismic measurements. The measurements made of the waves traveling along ray path 114 and ray path 124 are measurements of primary reflection waves.

In addition, a portion of the wave traveling upwardly along ray path 117 can be reflected by the water bottom 104 and travel downwardly along the ray path 125. The wave traveling downwardly along ray path 125 can then be reflected by the layer boundary 116 again, travel upwardly along the ray path 126 until it transmits through the water bottom 104, and travel upwardly along the ray path 137 until it is detected by the hydrophones 109 and geophones 110. The measurements made of the waves traveling along ray path 137 are measurements of seismic multiples, which have reflected off of the layer boundary 116 and the water bottom 104. The measurements of these seismic multiples can be attenuated by a seismic multiples mitigation system.

Figure 2:
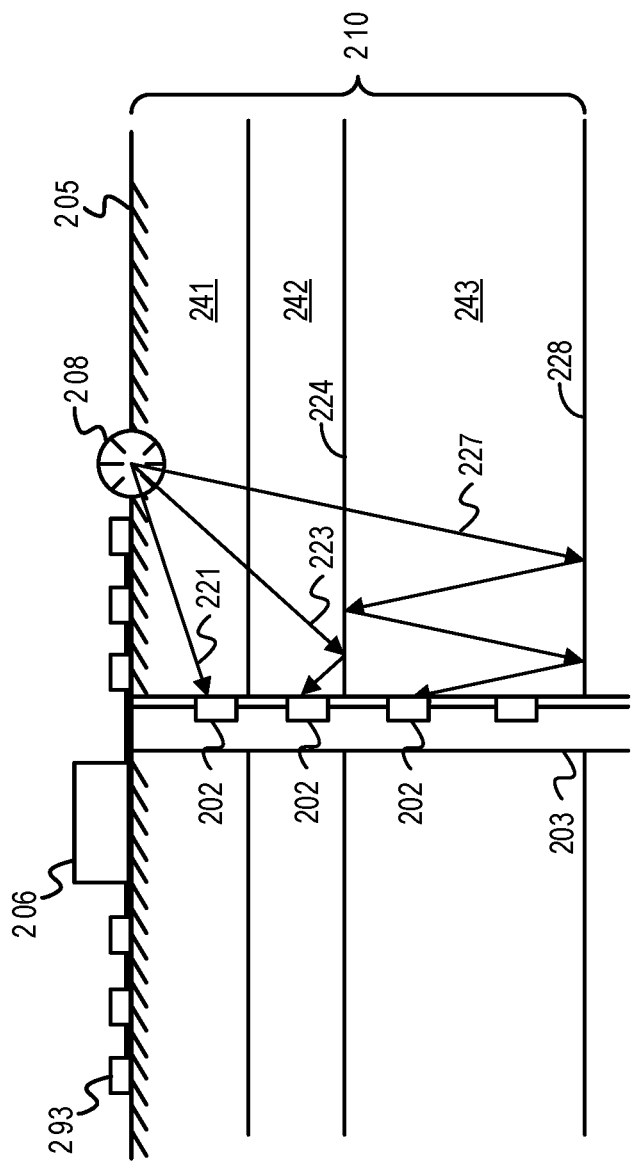
FIG. 2 depicts a schematic diagram of an onshore borehole seismic survey environment.

FIG. 2 depicts a schematic diagram of an onshore borehole seismic survey environment. Subsurface seismic sensors 202 are in a spaced-apart arrangement within a borehole 203 to detect seismic waves. The subsurface seismic sensors 202 can be fixed in place by anchors to facilitate sensing seismic waves. In other embodiments, the subsurface seismic sensors 202 can be attached to or integrated into a tubing (e.g. well casing or drill pipe), part of a logging-while-drilling (LWD) tool string, part of a bottomhole assembly, incorporated into a wireline logging tool, or attached to a wireline logging tool string. Furthermore, the subsurface seismic sensors 202 communicate wirelessly or via cable to a data acquisition system 206 at a surface 205, where the data acquisition system 206 receives, processes, and stores seismic measurements collected by the subsurface seismic sensors 202. In addition, the data acquisition system 206 can collect seismic measurements from the surface seismic sensors 293, which are positioned on the surface 205.

The seismic source 208 generates a seismic wave which is then measured and added to a set of seismic measurements. The seismic wave propagates through a formation 210. The formation 210 includes an upper layer 241, middle layer 242, and lower layer 243. A first seismic wave propagates along the wave trajectory 221 as a direct wave, which proceeds directly through the upper layer 241 to the subsurface seismic sensors 202 without reflection. A second seismic wave propagates along the wave trajectory 223, which shows a reflection at the interlayer boundary 224 before arriving at the subsurface seismic sensors 202. A third seismic wave is a seismic multiple that propagates along the wave trajectory 227, which travels through the upper layer 241, middle layer 242, and lower layer 243 before being reflected twice off the interlayer boundary 228 and once off the interlayer boundary 224 before arriving at the subsurface seismic sensors 202. Such waves reflect from acoustic impedance discontinuities to reach the subsurface seismic sensors 202 and are seismic multiples due to the plurality of reflections off of interlayer boundaries. Illustrative discontinuities include faults, boundaries between formation beds, and boundaries between formation fluids. The collected seismic measurements can be used for seismic characterization, and seismic measurements corresponding to the third seismic wave propagating along the wave trajectory 227 and other seismic multiples can be attenuated.

Example Operations

Figure 3:
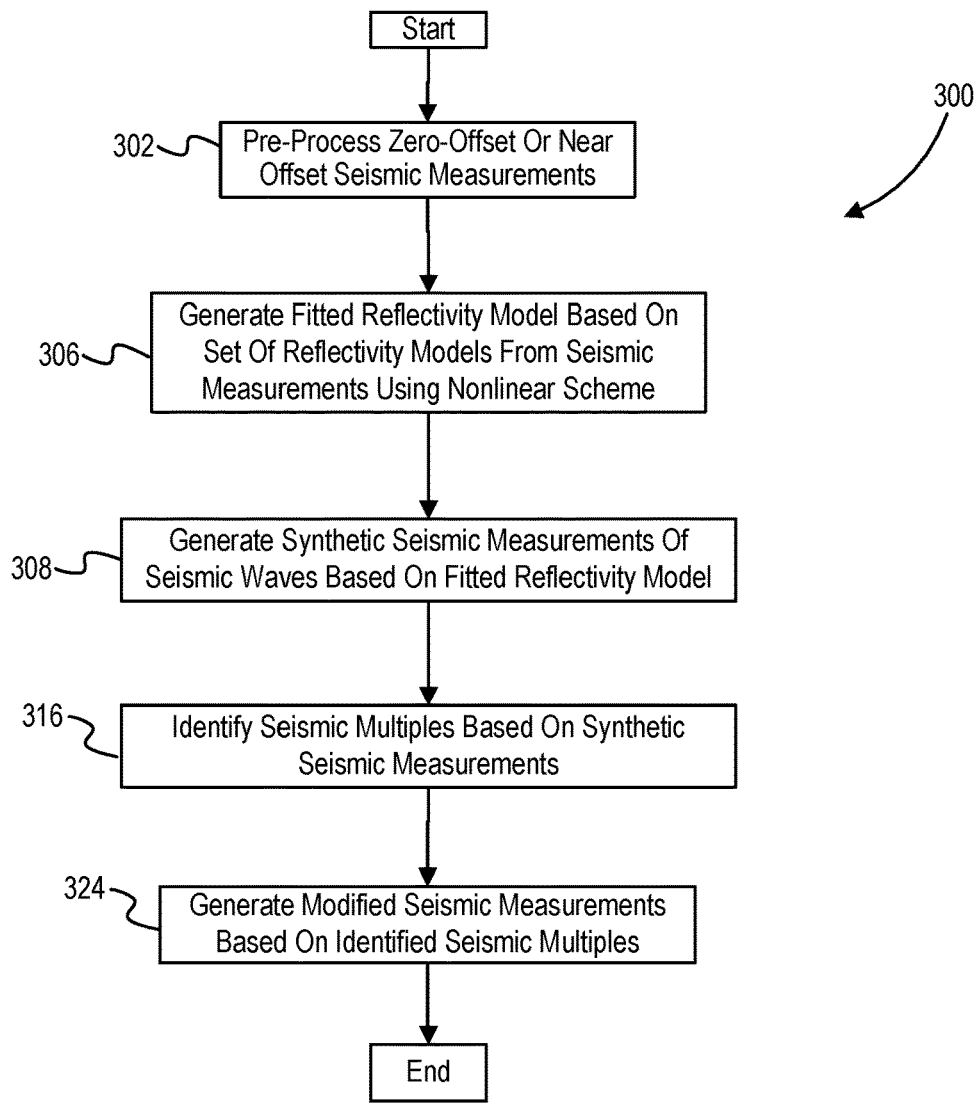
FIG. 3 depicts a flowchart of operations to generate a seismic model.

FIG. 3 depicts a flowchart of operations to generate a seismic model. Operations of the flowchart 300 begin at block 302. Operations of the flowchart 300 can be performed with by a system comprising a processor.

At block 302, zero offset or near offset seismic measurements corresponding to seismic waves are pre-processed. A system can determine that seismic measurements corresponding to seismic waves are zero offset or near offset based on information indicating that a seismic source of the seismic waves is within 200 meters from the well head of a borehole corresponding to the seismic measurements. Furthermore, pre-processing can include identifying surface-generated seismic multiples as arriving at a seismic sensor later than the direct waves and, in the case of near offsets, as being parallel or near-parallel to their corresponding direct waves. In addition, a deconvolution operator can be used to further pre-process surface seismic measurements to remove surface-generated seismic multiples from them. Removal of these surface-generated seismic multiples can be used to increase the accuracy of the inversion operations disclosed below.

In addition, the system can pre-process seismic measurements by using frequency and/or amplitude thresholds to remove noise in the seismic measurements. For example, a system can use seismic measurements with frequencies bound between a set of frequency thresholds that correspond with the upper and lower bounds of target seismic disturbances. Similarly, seismic measurements with amplitudes less than a noise threshold can be immediately altered to directly attenuate the low-amplitude seismic measurements (e.g. by reducing the seismic measurement for that region to zero or minimum threshold value). The pre-processing can be performed independently of any model that uses wavefield separation algorithms which decompose seismic measurements. The system can also perform additional pre-processing operations including applying filters to reduce noise, remove data entry error, etc.

At block 306, a fitted reflectivity model is generated based on a set of reflectivity models from the seismic measurements using a nonlinear scheme. A fitted reflectivity model is a model that includes at least one length dimension corresponding to the layers in a geological formation and a property corresponding with the expected speed of seismic waves traveling in at least one of the layers. A reflectivity model is a geological model and includes a set of reflectivity parameters representing one or more material properties of layers in a geological formation (e.g. velocity, density, etc.) and has the capacity to model different types of near offset waves separately or together. Different types of near offset waves an include upgoing waves, downgoing waves, direct waves, first reflection waves, seismic multiples, etc. An example reflectivity model can include four stacked layers having three interlayer boundaries at known depths within a geological model with corresponding reflectivity parameters for each of the layers in the geological model. The reflectivity model can be used in a forward modeling engine during the application of an inversion operation, wherein the inversion operation uses a reflectivity method. The reflectivity method provides a means of solving the full wave equation for a one-dimensional media (e.g. the media varies only in depth) and can include modeling the geological formation as a stack of layers in a reflectivity model. For example, the system inverts the seismic measurements by solving the full wave equation for a stack of layers to determine the reflectivity model. The inversion operation can be used to determine one or more suitable reflectivity models based on zero offset and near offset seismic measurements. The inversion operation can include both global inversion operations and local inversion operations to increase convergence speed.

Reflectivity models can include both isotropic models and anisotropic models that have anisotropic parameters. In some embodiments, the inversion operation can include solving for the modes of P wave and S wave propagation in the stack of layers. In some embodiments, the inversion operation can include inversion of the original seismic measurements into a fitted reflectivity model that provides an estimate of one or more P wave velocities in a formation by simulating one or more waves traveling through the fitted reflectivity model and/or calculating the P wave velocity based on its relationship with other values in the fitted reflectivity model (e.g. S wave velocity, formation material density, etc.). The inversion operation to determine the fitted reflectivity model can include using one or more assumed formation material density values and S wave velocities. Alternatively, the inversion operation can include setting one or both of the formation material density and S wave velocities at one or more fixed values. Alternatively, the inversion operation can include varying the formation material density and/or S wave velocities based on one or more functions of the changing P wave velocities during the inversion iterations.

The system uses a nonlinear scheme when using the inversion operation to generate a fitted reflectivity model (e.g. a high-resolution fitted reflectivity model). The nonlinear scheme is a method that provides a maximum or minimum value of a function over the input values or combination of input values in an input set of values. Using a nonlinear scheme to generate the fitted reflectivity model can include determining a maximum fit (i.e. lowest difference) between seismic measurements and the predicted seismic measurement outputs produced from an input set of reflectivity models or combination of models in an input set of reflectivity models. The nonlinear scheme can be a genetic algorithm-based method, which provides a means of comparing/modifying various reflectivity models to determine which elements of the reflectivity models are matches for the seismic measurements within a matching threshold, wherein an element can be a geometric parameter (e.g. a shape, formation angle, volume, length value, etc.), a number of formation layers, an arrangement of formation layers, or a formation parameter (e.g. a resistivity, reflectivity value, formation anisotropy, density, etc.). A fitted reflectivity model can provide a distribution of wave velocities and formation densities in a formation along the depth of the formation. For example, the system can use a genetic algorithm to determine that three reflectivity models are most likely based on seismic measurements such as shot gather field values. In some embodiments, the system can generate a fitted reflectivity model based on the elements from one or more of the three reflectivity models that most accurately match the seismic measurements. In other embodiments, the system can use other nonlinear schemes (e.g. differential evolution) to provide a means of comparing/modifying various reflectivity models.

At block 308, synthetic seismic measurements of seismic waves are generated based on the fitted reflectivity model. Generating synthetic seismic measurements can include generating characteristics of both upgoing and downgoing seismic waves. Characteristics of upgoing and downgoing seismic waves can include numeric values such as wave velocity, amplitude, frequency, etc. Characteristics of seismic waves can also include whether the wave is a direct wave, primary reflection wave, or a seismic multiple. When the characteristics of a particular synthetic seismic wave include being a seismic multiple, the particular synthetic seismic wave is a synthetic seismic multiple. In some embodiments, generating characteristics of seismic waves can include generating function(s) and/or relationships that characterize the behavior of the seismic waves relative to each other, a time, or a position. The system can use the fitted reflectivity model to generate simulated measurements of direct waves, primary reflection waves, and seismic multiples based on a seismic waveform algorithm. For example, generating characteristics of synthetic seismic measurements can include generating a function that provides a synthetic wave position as a function of time, the number of reflections of a synthetic wave, and their corresponding interlayer boundaries. Alternatively, or in addition, generating characteristics of synthetic seismic measurements can include generating a seismogram comprising isolated seismic multiples that can be represented independently from direct waves or primary reflection waves. These synthetic seismic measurements can be used to predict the location and path taken by seismic multiples.

At block 316, the system identifies seismic multiples based on the synthetic seismic measurements. A system can identify the set of seismic multiples by comparing the synthetic seismic measurements to the seismic measurements described for block 302 to determine which of the seismic measurements are sufficiently similar to a synthetic seismic multiple, wherein sufficient similarity can be based on one or more quantifiable values and/or categorical values. For example, seismic measurements of a detected wave can be compared to those of a synthetic seismic multiple based on various metrics (e.g. the time difference from a direct wave, an amplitude value, and a measurement depth value), wherein a similarity value is based on a mean squared error (MSE) between the seismic measurements of the detected wave and the synthetic seismic measurements. In other examples, different metrics can be used and combined to determine a similarity value (e.g. by using a weighted average, etc.).

In some embodiments, the system can store the identified seismic multiples and their corresponding seismic measurements by storing a wave-identifying indicator in an array that can be used to identify the detected wave, wherein the system can access the seismic multiple by using the wave-identifying indicator as an index value. Alternatively, or in addition, the system can store the seismic multiples by storing one or more seismic measurements corresponding to the seismic multiples. For example, the system can store a set of seismic measurements corresponding to the detected wave in the entire range from when a detected wave starts to when a detected wave ends. The system can store other values corresponding to the seismic measurements such as an average amplitude, wave detection period, and frequency corresponding to each of the detected waves determined to be a seismic multiple. Furthermore, storing the seismic multiple can include storing the synthetic seismic multiple used to determine that the detected wave is a seismic multiple. For example, the system can store a wave-identifying indicator in an array that can be used to identify the synthetic seismic multiple either in place of or in addition to storing the wave-identifying indicator of the detected wave.

At block 324, the system generates modified seismic measurements based on the identified seismic multiples. In some embodiments, the system can generate the modified seismic measurements as noise-reduced seismic measurements by adaptively subtracting the identified seismic multiples described for block 316 from the seismic measurements. The adaptive subtraction can include synchronizing one or more wave characteristics shown in the seismic measurements (e.g. an amplitude, time, phase, and frequency) between identified seismic multiples and synthetic seismic multiples before subtracting values corresponding to the identified seismic multiples from the seismic measurements. Alternatively, the adaptive subtraction can include setting the signal values within the established bounds of the identified seismic multiples to one or more predetermined reduced values. For example, if an identified seismic multiple is determined to exist in a particular range between a first time point and the second time point, the measured seismic values of the detected can be set to zero or a normalized baseline value (e.g. 0.01 normalized units) in that particular range.

In some embodiments, the modified seismic measurements include the seismic multiples, but also include a tag or label for the seismic multiples to indicate which of the measured seismic waves as corresponding to seismic multiples for analysis purposes In some embodiments, the system can generate the modified seismic measurements by also adaptively subtracting seismic measurements corresponding to direct waves or adaptively subtracting seismic measurements corresponding to primary reflection waves. Once the modified seismic measurements are generated, operations of the flowchart 300 can be complete.

Example Models

Figure 4:
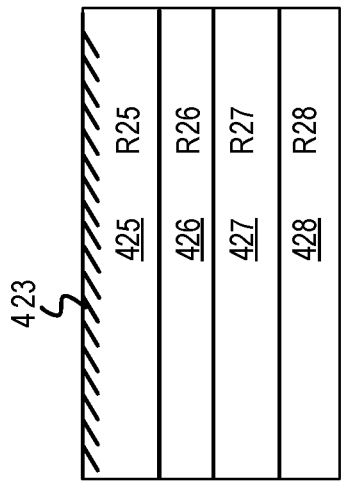
FIG. 4 depicts an example seismic models representing a set of reflectivity models used during a nonlinear scheme.
Figure 4:
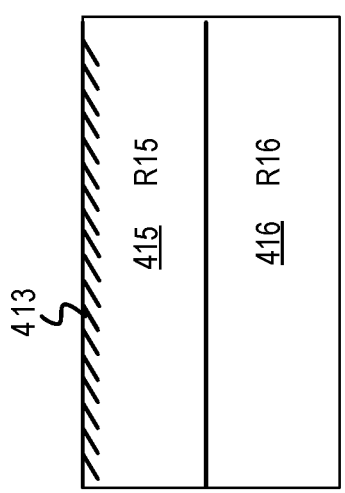
Figure 4:
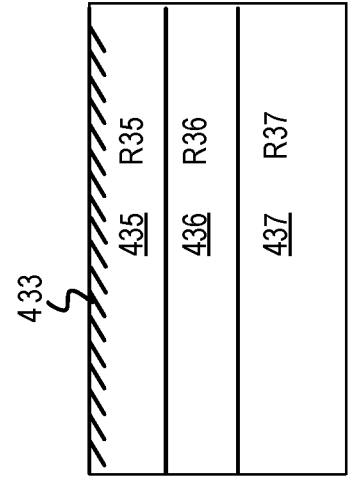
Figure 4:
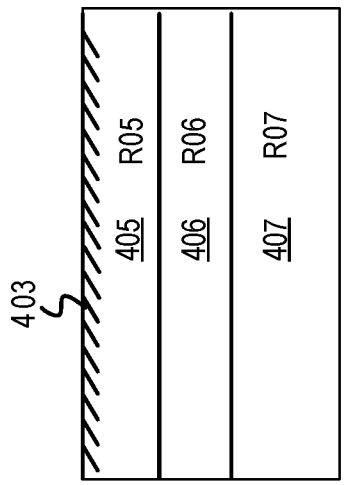

FIG. 4 depicts an example seismic models representing a set of reflectivity models used during a nonlinear scheme. The seismic model 403 includes horizontal layers 405-407 that are stacked sequentially on top of one another. The horizontal layer 405 has a reflectivity value of R16, the horizontal layer 406 has a reflectivity value of R06, and the horizontal layer 407 has a reflectivity value of R07. The seismic model 413 includes horizontal layers 415-416 that are stacked sequentially on top of one another. The horizontal layer 415 has a reflectivity value of R16 and the horizontal layer 416 has a reflectivity value of R16. The seismic model 423 includes horizontal layers 425-428 that are stacked sequentially on top of one another. The horizontal layers 425-428 can respectively have the reflectivity values of R25, R26, R27 and R28. Each of the reflectivity values can be the same as one or more of the other reflectivity values or can be different from each of the other reflectivity values. In some embodiments, each of the reflectivity values can be within their own range of reflectivity values, wherein each of the ranges of reflectivity values corresponding with one of the horizontal layers in their respective seismic model. For example, the reflectivity value R16 can be within a range that corresponds to the horizontal layer 405.

A seismic multiples mitigation system can apply a nonlinear scheme to determine which reflectivity model or combination of reflectivity models match seismic measurements within a matching threshold. For example, after using a generic algorithm method, the seismic multiples mitigation method can generate a fitted reflectivity model represented by the seismic model 433, which includes horizontal layers 435-437 that are stacked sequentially on top of one another similar to the seismic model 403. However, instead being restricted to only the reflectivity values/ranges from the seismic model 403, the horizontal layers 435-37 respectively have the reflectivity values of R35, R36, and R37, each of which can be based on reflectivity values or ranges of reflectivity values from different seismic models. In this example, the reflectivity value R35 is within a range corresponding the horizontal layer 405 from the seismic model 403, R36 is within a range corresponding to the horizontal layer 416 from the seismic model 413, and R7 is within a range corresponding to the horizontal layer 428 from the seismic model 423. The seismic multiples mitigation system can use a fitted reflectivity model to represent the seismic model 433 and generate a fitted reflectivity model. As shown in this example, the seismic multiples mitigation system can invert the seismic measurements to a fitted reflectivity model having a first fitted reflectivity value and a second fitted reflectivity value, wherein the first fitted reflectivity value is based on a first range of reflectivity values from a first model of a set of reflectivity models and the second fitted reflectivity value is based on a different range of reflectivity values from a different model from the set of reflectivity models. While this example uses reflectivity values, other formation property values of the formation can be used. The seismic multiples mitigation system can then use the fitted reflectivity model to generate synthetic seismic measurements corresponding to synthetic seismic multiples and/or isolate one or more sets of seismic measurements that do not include measurements corresponding to seismic multiples.

Example Data

Figure 5:
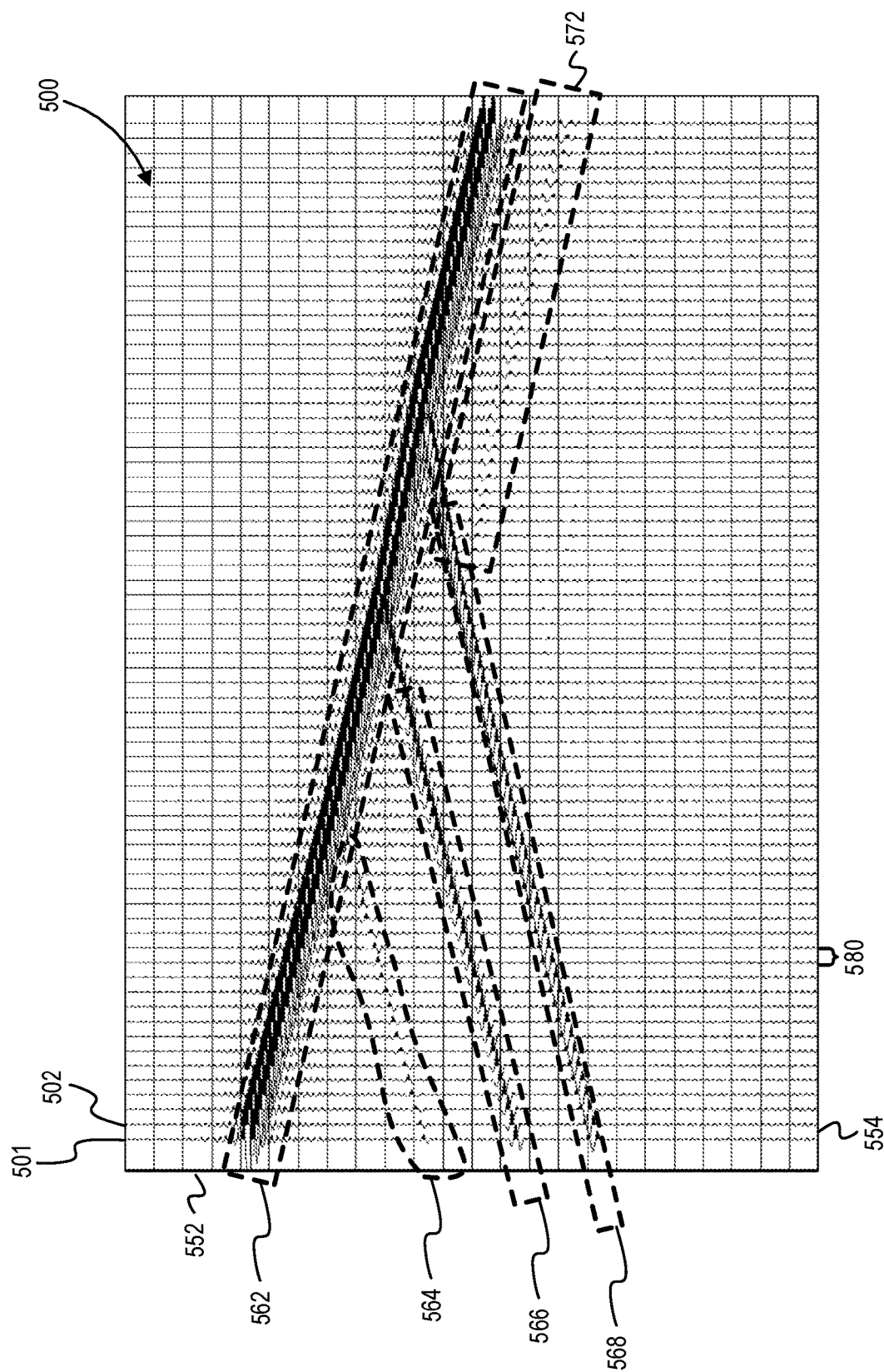
FIG. 5 depicts seismic measurements from a set of seismic sensors.

FIG. 5 depicts seismic measurements from a set of seismic sensors. The vertical axis 552 of the seismic measurements plot 500 represents a measurement time axis. The horizontal axis 554 of the of the seismic measurements plot 500 represents a measurement channel axis. The seismic measurements plot 500 shows measurement values from one of the full measurement channels overlaid on top of each other and shifted from each other neighboring measurement channel by a preset distance 580 on the seismic measurements plot 500. Each of the of full measurement channels represents measurements from one of a set of seismic sensors arranged sequentially along a length of a wellbore in a descending direction. For example, the measurement channel 501 represents the measurements made at a first seismic sensor at 1010 meters and the measurement channel 502 represents the measurements made at a second seismic sensor at 1020 meters.

The seismic measurements plot 500 includes wave measurements corresponding to various seismic waves measured in the full measurement channels. The first set of seismic wave measurements 562 along the measurements are the set of wave measurements are the first waves measured by each of the full measurement channels and increase in measurement time over the increasing depth of the full measurement channels. This can be indicative of a seismic source positioned above all of the seismic sensors corresponding with the full measurement channels. For example, the seismic source can be at the surface of geological formation.

In addition, the seismic measurements plot 500 includes a second set of seismic wave measurements 564, a third set of seismic wave measurements 566, a fourth set of seismic wave measurements 568 and a fifth set of seismic wave measurements 572. Some of the sets of seismic wave measurements can be used during a seismic characterization operation to provide a greater understanding of a geological formation and others can be attenuated to increase characterization accuracy. As further described below, clarification on whether these sets of seismic wave measurements represent direct waves, primary reflection waves, or seismic multiples can increase the accuracy of seismic images produced using the data represented by the seismic measurements plot 500.

Figure 6:
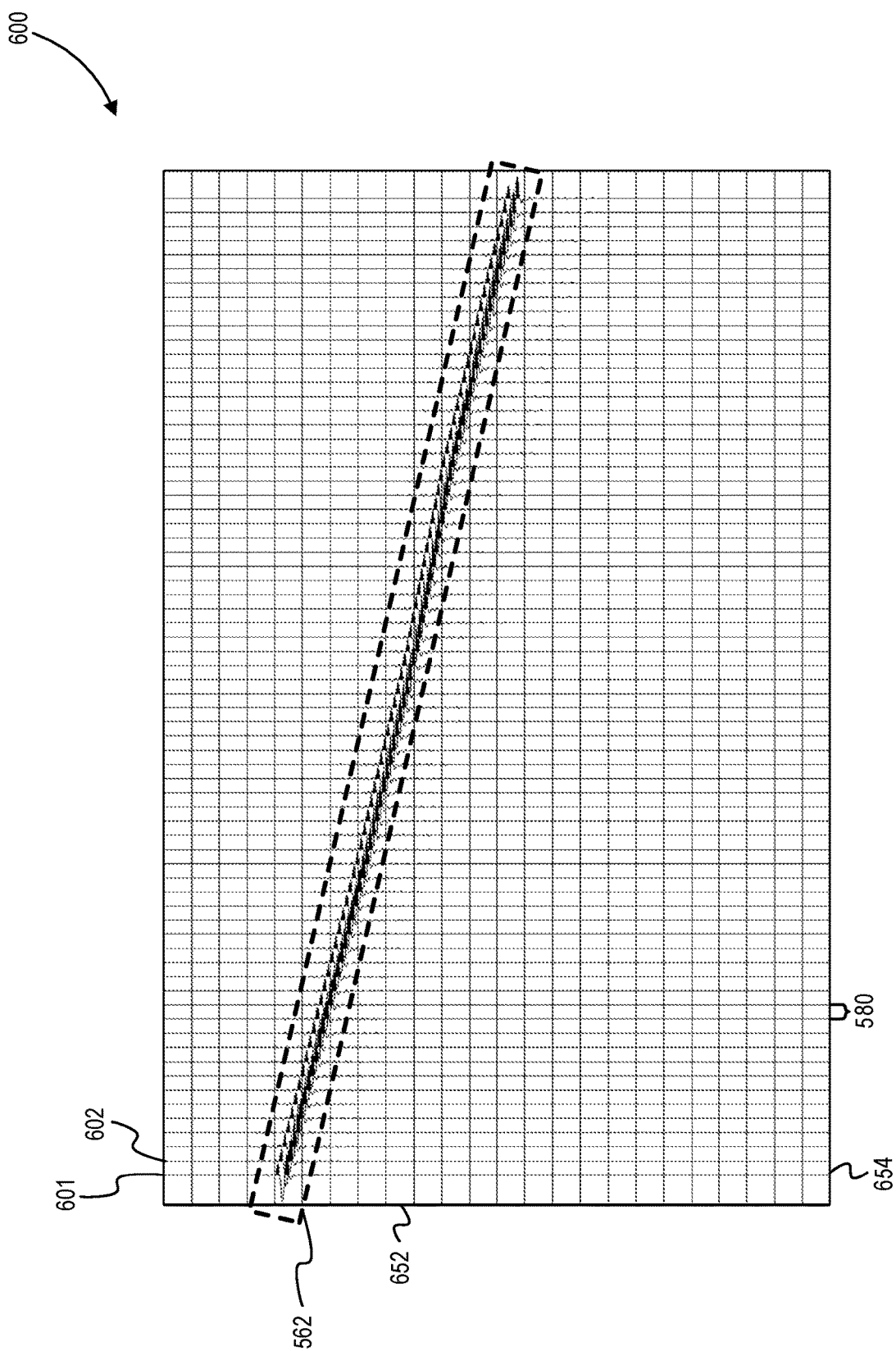
FIG. 6 depicts seismic measurements corresponding to an isolated direct wave.

FIG. 6 depicts seismic measurements corresponding to an isolated direct wave. Descriptions of FIG. 6 are made with further reference to FIG. 3 and FIG. 5. The measurement values shown in the direct wave seismic measurements plot 600 are based on measurement values represented by the seismic measurements plot 500 after filtering for noise, adaptively subtracting the seismic measurements corresponding to seismic multiples (e.g. the fifth set of seismic wave measurements 572) and adaptively subtracting the seismic measurements corresponding to upgoing waves (e.g. the other sets of seismic wave measurements 564, 566 and 568). The vertical axis 652 of the direct wave seismic measurements plot 600 represents a measurement time axis. The horizontal axis 654 of the of the direct wave seismic measurements plot 600 represents a measurement channel axis. The direct wave seismic measurements plot 600 shows sensor data from one of the modified measurement channels, such as a direct wave measurement channel 601 and a direct wave measurement channel 602. The modified measurement channels are overlaid on top of each other and shifted by a preset distance equal to the preset distance 580. Each of the direct wave measurement channels show a subset of measurement values that are the same measurement values as one of the full measurement channels in the seismic measurements plot 500 at the region of a direct wave. For example, with reference to FIG. 5, the direct wave measurement channel 601 represents a modified subset of the measurements made by the first seismic sensor at 1010 meters corresponding with the measurement channel 501.

After either pre-processing or an inversion operation, the first set of seismic wave measurements 562 can be determined to correspond with direct waves. For example, with reference to FIG. 3 and FIG. 5, after block 302, the amplitude and/or other characteristics of the first set of seismic wave measurements 562 can be used to determine that the seismic wave measurements corresponds with a direct wave. In some embodiments, an example condition can be that if a measurement is determined to be part of a wave (e.g. an amplitude exceeds an amplitude threshold) and is the first wave to be detected after the initiation of a seismic disturbance, that wave is a direct wave. Other example conditions can be used during pre-processing. These direct waves can be isolated from the seismic measurements to provide the isolated first set of seismic wave measurements 562 as shown in the direct wave seismic measurements plot 600.

Figure 7:
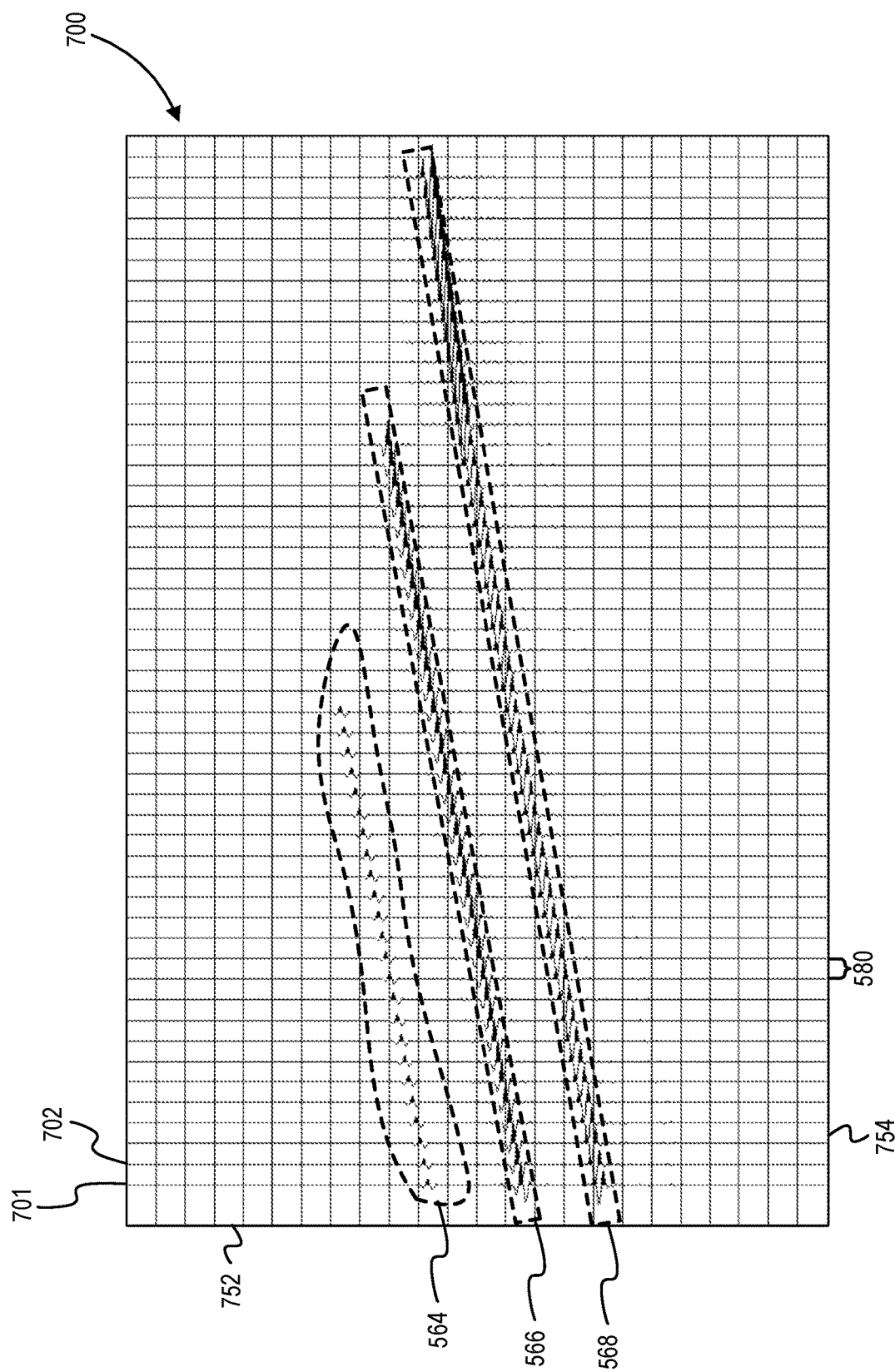
FIG. 7 depicts seismic measurements corresponding to isolated upgoing waves.

FIG. 7 depicts seismic measurements corresponding to isolated upgoing waves. Descriptions of FIG. 7 are made with further reference to FIG. 3 and FIG. 5. The measurement values shown in the upgoing wave seismic measurements plot 700 are based on measurement values represented by the seismic measurements plot 500. The vertical axis 752 of the upgoing wave seismic measurements plot 700 represents a measurement time axis. The horizontal axis 754 of the of the upgoing wave seismic measurements plot 700 represents a measurement channel axis. The upgoing wave seismic measurements plot 700 shows sensor data from one of the upgoing wave measurement channels such as an upgoing wave measurement channel 701 and an upgoing wave measurement channel 702. The upgoing wave measurement channels are overlaid on top of each other and shifted by a preset distance equal to the preset distance 580. Each of the upgoing wave measurement channels show a subset of measurement values that are equal to the measurement values from one of the full measurement channels from the seismic measurements plot 500 of FIG. 5 in the region of an upgoing wave. For example, with further reference to FIG. 5, the upgoing wave measurement channel 701 represents a modified subset of the measurements made by first seismic sensor at 1010 meters corresponding with the measurement channel 501.

After either pre-processing or an inversion operation, the second set of seismic wave measurements 564, third set of seismic wave measurements 566, and fourth set of seismic wave measurements 568 can be determined to be upgoing waves and isolated by adaptively subtracting the seismic measurements corresponding to seismic multiples (e.g. the fifth set of seismic wave measurements 572) and adaptively subtracting the seismic measurements corresponding to direct waves (e.g. the first set of seismic wave measurements 562). For example, with reference to FIG. 3 and FIG. 5, at block 302, the amplitude and/or other characteristics of the second set of seismic wave measurements 564 corresponding with a measurement channel can be used to determine that a seismic wave measurement corresponds with an upgoing wave. If a measurement is determined to be part of an upgoing wave (e.g. an amplitude exceeds an amplitude threshold but is less than a direct wave threshold), that wave can labeled as an upgoing wave. The isolation of these upgoing waves can increase the accuracy of a seismic characterization operation.

Example Drilling System

Figure 8:
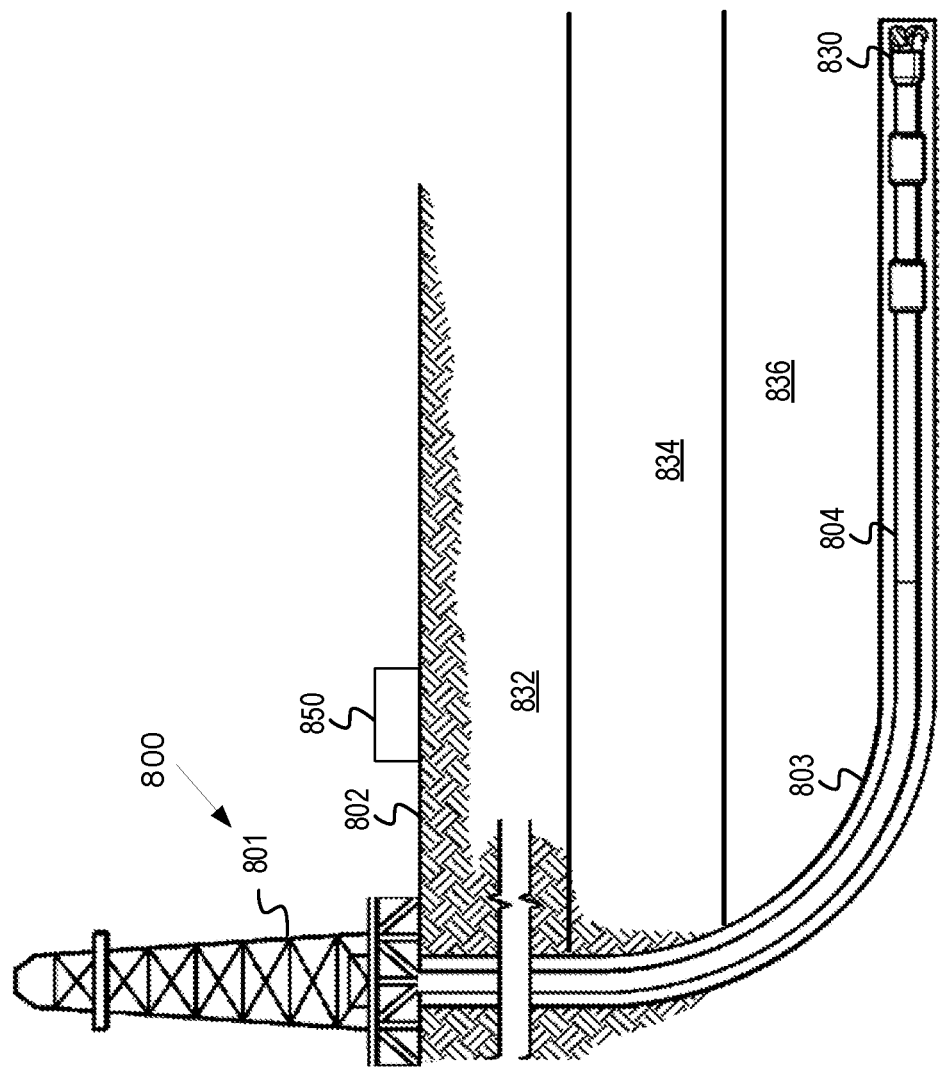
FIG. 8 depicts a drilling system with a seismic multiple attenuation system.

FIG. 8 depicts a drilling system with a seismic multiple attenuation system. FIG. 8 depicts a drilling system 800. The drilling system 800 includes a drilling rig 801 located at the surface 802 of a borehole 803. The initial position of the borehole 803 and various operational parameters (e.g. drilling speed, weight on bit, drilling fluid pump rate, drilling direction, drilling fluid composition) for drilling can be selected using one or more seismic characterization results based on the reduced-noise seismic measurements disclosed above. For example, with reference to FIG. 3, the position of the borehole 803 can be selected to drill to a target depth using seismic characterization results based on modified seismic measurements generated by the operations disclosed above in blocks 302-324. The drill string 804 can be operated for drilling the borehole 803 through the first formation layer 832, second formation layer 834, and third formation layer 836 with the bottomhole assembly (BHA).

The BHA includes a drill bit 830 at the downhole end of the drill string 804. The drill bit 830 is positioned at a depth in the third formation layer 836, wherein a target depth and penetration are based on the reduced-noise seismic measurements provided by a seismic multiples mitigation system. The BHA and the drill bit 830 can be coupled to computing system 850, which can operate the drill bit 830 as well as receive data based on the sensors attached to the BHA. The drill bit 830 can be operated to create the borehole 803 by penetrating the surface 802 and the formation layers. By increasing the accuracy of seismic characterization, the drill bit 830 can more safely and accurately penetrate the third formation layer 836. For example, sensors on the BHA can transmit a signal to the computing system 850 that the drill bit is near a target depth in the third formation layer 836, and the computing system can direct the drill bit 830 towards the target depth.

Example Computer Device

FIG. 9 depicts an example computer device. A computer device 900 includes a processor 901 (possibly including a plurality of processors, a plurality of cores, a plurality of nodes, and/or implementing multi-threading, etc.). The computer device 900 includes a memory 907. The memory 907 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 900 also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.).

In some embodiments, the computer device 900 includes a seismic multiples attenuator 911 and a controller 912. The seismic multiples attenuator 911 can perform one or more operations for detecting and attenuating the seismic multiples, including using a nonlinear scheme on a set of reflectivity models (as described above). A controller 912 can also perform one or more operations for controlling a drilling system, well treatment system, or wireline system. Any one of the previously described functionalities can be partially (or entirely) implemented in hardware and/or on the processor 901. For example, the functionality can be implemented with an application specific integrated circuit, in logic implemented in the processor 901, in a co-processor on a peripheral device or card, etc. Further, realizations can include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 can be coupled to the processor 901. The computer device 900 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across a plurality of machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, a plurality of the listed items, and one or more of the items in the list and another item not listed. A set of items can have only one item or more than one item.

Example Embodiments

Example embodiments include the following:

Embodiment 1: An apparatus comprising: a seismic sensor to detect seismic waves having at least a subset of seismic multiples; a processor; and a machine-readable medium having program code executable by the processor to cause the apparatus to, determine seismic measurements of the seismic waves; generate a fitted reflectivity model based on a set of reflectivity models using a nonlinear scheme; identify a subset of the seismic measurements corresponding to the subset of seismic multiples; and generate a set of reduced-noise seismic measurements based on the subset of the seismic measurements.

Embodiment 2: The apparatus of Embodiment 1, wherein the program code to generate the fitted reflectivity model comprises program code executable by the processor to cause the apparatus to invert the seismic measurements of the seismic waves to the fitted reflectivity model based on a first range of values from a first model from the set of reflectivity models and a second range of values from a second model from the set of reflectivity models.

Embodiment 3: The apparatus of Embodiments 1 or 2, further comprising program code executable by the processor to cause the apparatus to determine a P wave velocity based on the fitted reflectivity model.

Embodiment 4: The apparatus of any of Embodiments 1-3, wherein the program code to generate the fitted reflectivity model comprises program code executable by the processor to cause the apparatus to use a varying formation material density, wherein the varying formation material density is a function of P wave velocities.

Embodiment 5: The apparatus of any of Embodiments 1-4, wherein the program code to generate the set of reduced-noise seismic measurements comprises program code executable by the processor to cause the apparatus to adaptively subtracting values in the subset of the seismic measurements from the seismic measurements of the seismic waves.

Embodiment 6: The apparatus of any of Embodiments 1-5, wherein the nonlinear scheme is a genetic algorithm method.

Embodiment 7: The apparatus of any of Embodiments 1-6, wherein at least one of the set of reflectivity models is anisotropic.

Embodiment 8: A method comprising: determining seismic measurements of seismic waves detected by a seismic sensor, wherein the seismic waves comprise a subset of seismic multiples; generating a fitted reflectivity model based on a set of reflectivity models using a nonlinear scheme; identifying a subset of the seismic measurements corresponding to the subset of seismic multiples; and generating a set of reduced-noise seismic measurements based on the subset of the seismic measurements.

Embodiment 9: The method of Embodiment 8, wherein generating the fitted reflectivity model comprises inverting the seismic measurements of the seismic waves to the fitted reflectivity model based on a first range of values from a first model from the set of reflectivity models and a second range of values from a second model from the set of reflectivity models.

Embodiment 10: The method of Embodiments 8 or 9, further comprising determining a P wave velocity based on the fitted reflectivity model.

Embodiment 11: The method of any of Embodiments 8-10, wherein generating the fitted reflectivity model comprises using a varying formation material density, wherein the varying formation material density is a function of P wave velocities.

Embodiment 12: The method of any of Embodiments 8-11, wherein generating the set of reduced-noise seismic measurements comprises adaptively subtracting values in the subset of the seismic measurements from the seismic measurements of the seismic waves.

Embodiment 13: The method of any of Embodiments 8-12, wherein the nonlinear scheme is a genetic algorithm method.

Embodiment 14: The method of any of Embodiments 8-13, wherein at least one of the set of reflectivity models is anisotropic.

Embodiment 15: One or more non-transitory machine-readable media comprising program code for generating a set of reduced-noise seismic measurements, the program code to: determine seismic measurements of seismic waves detected by a seismic sensor, wherein the seismic waves comprise a subset of seismic multiples; generate a fitted reflectivity model based on a set of reflectivity models using a nonlinear scheme; identify a subset of the seismic measurements corresponding to the subset of seismic multiples; and generate the set of reduced-noise seismic measurements based on the subset of the seismic measurements.

Embodiment 16: The one or more non-transitory machine-readable media of Embodiment 15, wherein the program code to generate the fitted reflectivity model comprises program code to invert the seismic measurements of the seismic waves to the fitted reflectivity model based on a first range of values from a first model from the set of reflectivity models and a second range of values from a second model from the set of reflectivity models.

Embodiment 17: The one or more non-transitory machine-readable media of Embodiments 15 or 16, further comprising program code to determine a P wave velocity based on the fitted reflectivity model.

Embodiment 18: The one or more non-transitory machine-readable media of any of Embodiments 15-17, wherein the program code to generate the set of reduced-noise seismic measurements comprises program code to adaptively subtracting values in the subset of the seismic measurements from the seismic measurements of the seismic waves.

Embodiment 19: The one or more non-transitory machine-readable media of any of Embodiments 15-18, wherein the nonlinear scheme is a genetic algorithm method.

Embodiment 20: The one or more non-transitory machine-readable media of any of Embodiments 15-19, wherein at least one of the set of reflectivity models is anisotropic.

What is claimed is:

1. An apparatus comprising:
   a seismic sensor;
   a processor; and
   a non-transitory machine-readable medium having program code executable by the processor to cause the apparatus to,
      fit a seismic reflectivity model to seismic measurements of a set of seismic waves obtained from the seismic sensor based, at least in part, on nonlinear inversion of the set of seismic waves, wherein the seismic reflectivity model is based, at least in part, on a set of reflectivity models;
      identify a subset of the seismic measurements corresponding to a subset of the seismic waves comprising seismic multiples based, at least in part, on the fitted seismic reflectivity model; and
      generate a set of reduced-noise seismic measurements based, at least in part, on the subset of the seismic waves comprising seismic multiples.

2. The apparatus of claim 1, wherein the program code to fit the seismic reflectivity model comprises program code executable by the processor to cause the apparatus to fit the seismic reflectivity model to a first model from the set of reflectivity models based on a first range of seismic measurement values and to a second model from the set of reflectivity models based on a second range of seismic measurement values.

3. The apparatus of claim 1, further comprising program code executable by the processor to cause the apparatus to determine a P wave velocity for a second subset of the seismic waves based on the fitted seismic reflectivity model.

4. The apparatus of claim 1, wherein the seismic reflectivity model comprises varying formation density, wherein the varying formation density is a function of P wave velocities.

5. The apparatus of claim 1, wherein the program code to generate the set of reduced-noise seismic measurements comprises program code to attenuate the subset of the seismic waves comprising seismic multiples in the seismic measurements.

6. The apparatus of claim 1, wherein the nonlinear inversion is based, at least in part, on a genetic algorithm.

7. The apparatus of claim 1, wherein the seismic reflectivity model is anisotropic.

8. A method comprising:
   obtaining seismic measurements of a set of seismic waves detected by a seismic sensor, wherein the set of seismic waves comprise a subset of seismic multiples;
   fitting a seismic reflectivity model to the seismic measurements, wherein the seismic reflectivity model is based, at least in part, on a nonlinear inversion of the set of seismic waves, wherein the seismic reflectivity model is based, at least in part, on a set of reflectivity models;
   identifying a subset of the seismic measurements corresponding to the subset of seismic multiples based, at least in part, on the fitted seismic reflectivity model; and
   generating a set of reduced-noise seismic measurements based, at least in part, on attenuation of the subset of the seismic measurements corresponding to the subset of seismic multiples.

9. The method of claim 8, wherein fitting the seismic reflectivity model comprises:
   fitting the seismic reflectivity model to a first model from the set of reflectivity models based on a first range of seismic measurement values and to a second model from the set of reflectivity models based on a second range of seismic measurement values.

10. The method of claim 8, wherein fitting the seismic reflectivity model comprises:
    determining at least a first P wave velocity,
    wherein fitting the seismic reflectivity model comprises varying formation density, wherein formation density is a function of at least the first P wave velocity.

11. The method of claim 8, wherein generating the set of reduced-noise seismic measurements comprises adaptively subtracting the subset of the seismic measurements corresponding to the subset of seismic multiples from the seismic measurements of the set of seismic waves.

12. The method of claim 8, wherein the nonlinear inversion is based, at least in part, on a genetic algorithm.

13. The method of claim 8, wherein at least one of the set of reflectivity models is anisotropic.

14. One or more non-transitory machine-readable media comprising program code for generating a set of reduced-noise seismic measurements, the program code to:
    fit a seismic reflectivity model to seismic measurements of a set of seismic waves based, at least in part, on nonlinear inversion of the set of seismic waves, and wherein the seismic reflectivity model is based, at least in part, on a set of reflectivity models;
    identify a subset of the seismic measurements corresponding to a subset of seismic multiples based, at least in part, on the fitted seismic reflectivity model; and generate a set of reduced-noise seismic measurements based, at least in part, on the subset of the seismic measurements corresponding to the subset of seismic multiples.

15. The one or more non-transitory machine-readable media of claim 14, wherein the program code to fit the seismic reflectivity model comprises program code to fit the seismic reflectivity model to a first model from the set of reflectivity models based on a first range of seismic measurement values and to a second model from the set of reflectivity models based on a second range of seismic measurement values.

16. The one or more non-transitory machine-readable media of claim 14, wherein program code to fit the seismic reflectivity model further comprises program code to determine at least one P wave velocity based on the fitted seismic reflectivity model.

17. The one or more non-transitory machine-readable media of claim 14, wherein the program code to generate the set of reduced-noise seismic measurements comprises program code to adaptively subtracting values of the subset of the seismic measurements corresponding to the subset of seismic multiples from the seismic measurements of the set of seismic waves.

18. The one or more non-transitory machine-readable media of claim 14, wherein the nonlinear inversion is based, at least in part, on a genetic algorithm.

19. The one or more non-transitory machine-readable media of claim 14, wherein at least one of the set of reflectivity models is anisotropic.

20. The apparatus of claim 5, wherein the program code to attenuate the subset of the seismic waves comprising seismic multiples comprises program code executable by the processor to cause the apparatus to adaptively subtract the subset of the seismic waves comprising seismic multiples from the seismic measurements of the set of seismic waves.

* * * * *